United States Patent
Farley et al.

(10) Patent No.: US 9,591,806 B2
(45) Date of Patent: Mar. 14, 2017

(54) AGRICULTURAL HEADER WITH MULTIPLE FINGER INFEED ASSEMBLY

(71) Applicant: CNH Industrial America LLC, New Holland, PA (US)

(72) Inventors: Herbert M. Farley, Elizabethtown, PA (US); Matthew D. Weeks, Troupsburg, NY (US); Dillon M. Thompson, New Holland, PA (US); Robert Stewart Boyd, Mount Joy, PA (US); Seth M. Bich, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/700,701

(22) Filed: Apr. 30, 2015

(65) Prior Publication Data

US 2016/0316628 A1 Nov. 3, 2016

(51) Int. Cl.
| A01D 43/02 | (2006.01) |
| A01D 89/00 | (2006.01) |
| A01D 61/00 | (2006.01) |

(52) U.S. Cl.
CPC ................................. A01D 61/008 (2013.01)

(58) Field of Classification Search
CPC .... A01D 61/008; A01D 89/003; A01D 89/00; A01D 89/001; A01F 12/305; E01H 1/045
USPC .............................................. 15/79.2; 56/364
See application file for complete search history.

(56) References Cited

U.S. PATENT DOCUMENTS

| 675,418 | A | * | 6/1901 | Shavland | ................ | A01F 12/00 460/113 |
| 2,529,180 | A | * | 11/1950 | Oehler | ................ | A01D 61/008 180/21 |
| 2,633,231 | A | * | 3/1953 | Pilcher | ................ | A01D 61/008 198/613 |
| 2,803,505 | A | * | 8/1957 | Oberholtz | ............ | A01D 61/008 384/192 |
| 3,126,693 | A | * | 3/1964 | Renn | .................... | A01D 89/002 15/207.2 |
| 3,620,223 | A | * | 11/1971 | Witzel | .................. | A01F 12/305 460/113 |

(Continued)

FOREIGN PATENT DOCUMENTS

| DE | 1929279 U | 12/1965 | | |
| DE | 2656053 A | * 6/1978 | ............. | A01F 29/00 |
| RU | 2430504 C1 | * 10/2011 | ............. | A01D 45/00 |

Primary Examiner — Árpád Fábián-Kovács
(74) Attorney, Agent, or Firm — Patrick M. Sheldrake

(57) ABSTRACT

An agricultural harvester includes a header with an infeed assembly including a driving element configured to rotate; a hollow tube rotationally coupled to the driving element and having a plurality of openings formed therein; and at least one finger unit rotatably held within the hollow tube. Each finger unit includes: a finger hub having at least one pivoting aperture formed therein and at least one driving aperture formed therein; a pivoting finger pivotally held within the at least one pivoting aperture and configured to at least partially extend out of one of the openings of the hollow tube during rotation; and a driving finger fixedly held within the at least one driving aperture and configured to at least partially extend into one of the openings of the hollow tube to rotate the finger unit by the hollow tube.

17 Claims, 6 Drawing Sheets

(56) References Cited

U.S. PATENT DOCUMENTS

| | | | |
|---|---|---|---|
| 4,085,573 A * | 4/1978 | Marsh | A01D 89/00 56/364 |
| 4,217,672 A | 8/1980 | Olivari | |
| 4,297,760 A | 11/1981 | Olivari | |
| 4,453,375 A * | 6/1984 | Field | A01D 89/002 56/14.6 |
| 4,484,684 A | 11/1984 | Tetreault | |
| 4,539,801 A * | 9/1985 | Field | A01D 61/008 198/613 |
| 4,574,815 A * | 3/1986 | West | A01F 12/442 460/80 |
| 6,435,966 B1 | 8/2002 | Heidjann et al. | |
| 6,986,241 B2 | 1/2006 | Beck | |
| 2005/0284124 A1* | 12/2005 | Patterson | A01D 61/008 56/364 |
| 2008/0083203 A1* | 4/2008 | Bich | A01D 75/182 56/14.4 |
| 2011/0061354 A1* | 3/2011 | Batu | A01D 89/002 56/12.5 |
| 2015/0208582 A1* | 7/2015 | Patterson | A01D 61/008 460/20 |

* cited by examiner

AGRICULTURAL HEADER WITH MULTIPLE FINGER INFEED ASSEMBLY

BACKGROUND OF THE INVENTION

1. Field of the Invention

The present invention relates to agricultural harvesters, and, more particularly, to header assemblies for agricultural harvesters.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

To convey cut crop material into the feeder housing from the header, an infeed assembly can be included in the header that directs the cut crop into a middle of the header and then utilizes rotating fingers to push the cut crop material toward the feeder housing. To increase the conveyance rate of cut crop material into the feeder housing, multiple fingers can be included in the infeed assembly.

One possible infeed assembly that can be used is described in U.S. Pat. No. 4,217,672 to Olivari. The infeed assembly taught by Olivari includes rake-like members, which can be fingers, on a revolving shaft that sweep and pick up leaves and other debris from a lawn and move them upwards within the housing of the device. The fingers extend outwardly from the shaft and the ends pass through apertures formed in a drum. The drum is off-center in relation to the shaft of the fingers so that in the revolving of the mechanism the ends of the fingers move back and forth through the apertures in the drum. The fingers taught by Olivari are made of a flexible material so that they can bend during operation as the relative position of the shaft to which they are attached changes in relation to the apertures in the drum. This flexibility allows the fingers to operate in the configuration taught by Olivari to push leaves and other light, flimsy materials, but makes them unsuitable for pushing heavier materials that would cause the fingers to bend during contact rather than the material being pushed by the fingers.

Another assembly that includes multiple fingers is a parts separator described by U.S. Pat. No. 4,484,684 to Tetreault. The separator taught by Tetreault includes a drum mounted for rotation about a first horizontal axis that constitutes an outer separator element, and an inner separator element mounted within the drum for rotation about a second horizontal axis which is spaced from and parallel with the first axis. The drum has apertures in its outer surface and the inner separator element includes pins which extend through the apertures, so that rotation of the inner and outer separator elements about their respective axes causes the outer end of each pin to reciprocate within the aperture between an inner position where the end of the pin is flush with the outer surface of the drum to an outer position where the end of the pin extends beyond the outer surface of the drum. The pins are attached to spindles, with most of the spindles being free to pivot and one of the spindles being fixed against pivoting. The spindles are driven by a shaft, with the fixed spindle's pins driving the drum. One problem with this arrangement is that the arrangement of the spindles is complicated and each spindle must extend the length of the inner separator element. Further, to keep one of the spindles fixed, bushings are placed in apertures of the drum to hold the fixed spindle's pins in place, which can wear away and allow the previously fixed spindle to pivot.

What is needed in the art is an infeed assembly that can overcome some of the previously described disadvantages of the prior art.

SUMMARY OF THE INVENTION

The present invention provides an infeed assembly having a rotatable tube with openings formed therein and a finger unit rotatably held in the tube having at least one pivoting finger extending out of an opening of the tube and a driving finger extending into an opening of the tube to rotate the finger unit by the tube.

The invention in one form is directed to an agricultural harvester including: a chassis; a threshing and separating mechanism carried by the chassis; a feeder housing carried by the chassis and configured to supply crop material to the threshing and separating mechanism; and a header carried by the chassis in front of the feeder housing. The header includes a cutting mechanism configured to cut crop material and an infeed assembly carried behind the cutting mechanism configured to direct the cut crop material toward the feeder housing. The infeed assembly includes a driving element configured to rotate; a hollow tube rotationally coupled to the driving element and having a plurality of openings formed therein; and at least one finger unit rotatably held within the hollow tube. Each finger unit includes: a finger hub having at least one pivoting aperture formed therein and at least one driving aperture formed therein; a pivoting finger pivotally held within the at least one pivoting aperture and configured to at least partially extend out of one of the openings of the hollow tube during rotation; and a driving finger fixedly held within the at least one driving aperture and configured to at least partially extend into one of the openings of the hollow tube to rotate the finger unit by the hollow tube.

The invention in another form is directed to an infeed assembly including a driving element configured to rotate; a hollow tube rotationally coupled to the driving element and having a plurality of openings formed therein; and at least one finger unit rotatably held within the hollow tube. Each finger unit includes: a finger hub having at least one pivoting aperture formed therein and at least one driving aperture formed therein; a pivoting finger pivotally held within the at least one pivoting aperture and configured to at least partially extend out of one of the openings of the hollow tube during rotation; and a driving finger fixedly held within the at least one driving aperture and configured to at least partially extend into one of the openings of the hollow tube to rotate the finger unit by the hollow tube.

An advantage of the present invention is that a conveyance rate of cut crop material toward the feeder housing of an agricultural harvester can be increased.

Another advantage is the finger units can be easily replaced by other identical finger units.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
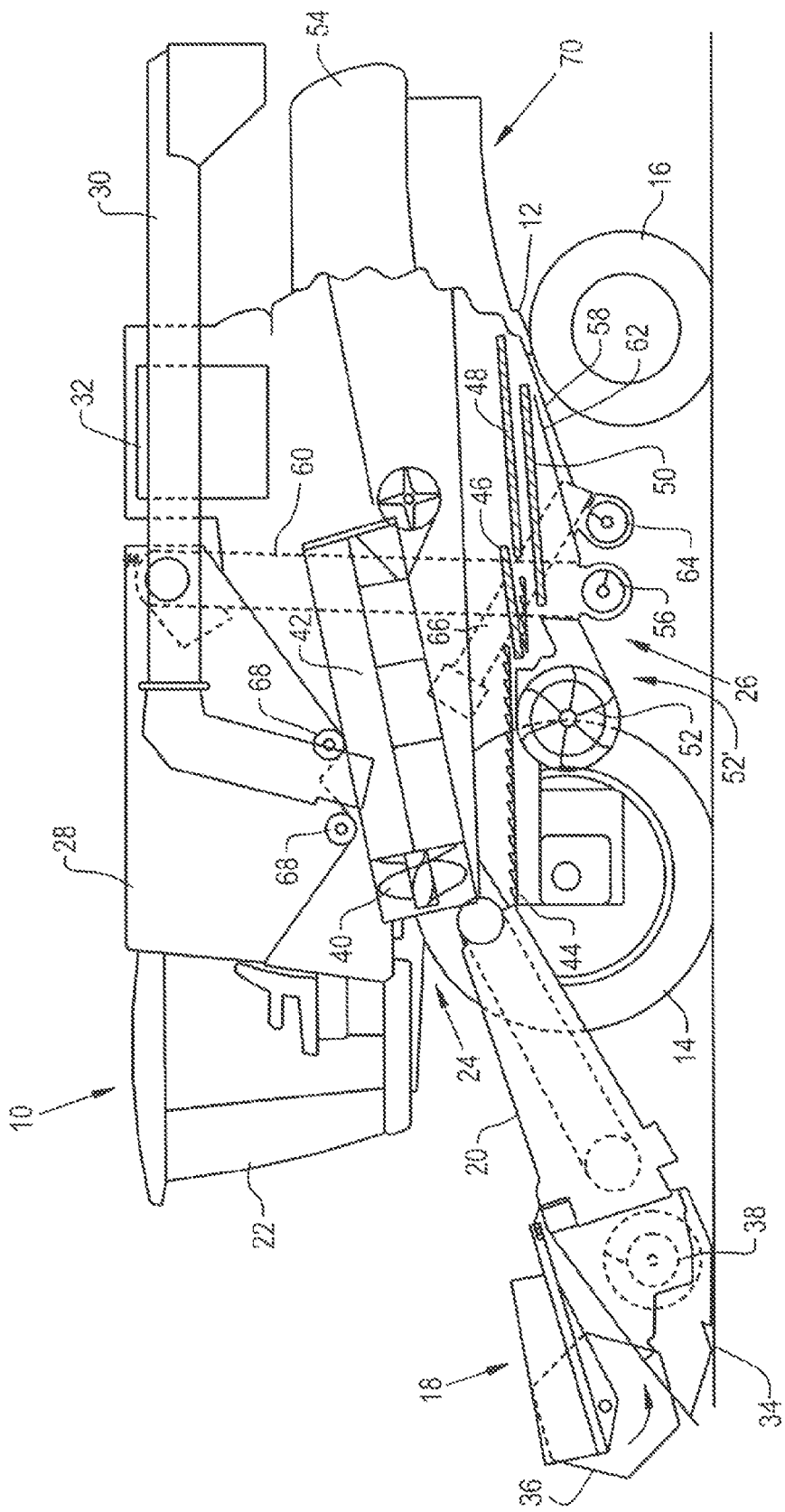
FIG. 1 is a perspective view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. While the rotatable reel 36 is shown as feeding crop material into the header 18, it should be appreciated that the rotatable reel 36 is optional. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
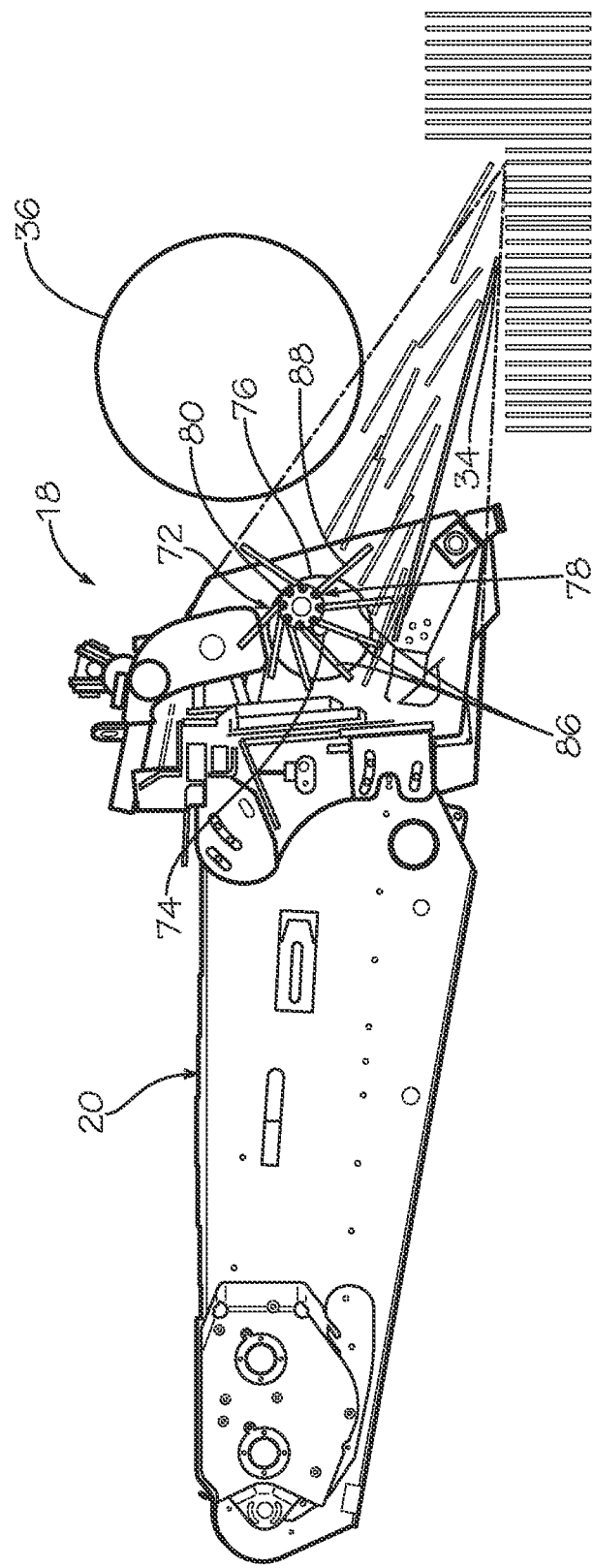
FIG. 2 is a side view of a portion of the agricultural harvester shown in FIG. 1 with portions cut away to show interior detail.

Referring now to FIG. 2, the header 18 and feeder housing 20 are shown with portions cut away to show interior detail. As can be seen, the header 18 includes an infeed assembly 72 that is held behind the cutter bar 34 (which can also be referred to as a cutting mechanism) and directs cut crop material toward the feeder housing 20. The infeed assembly 72 generally includes a driving element 74, shown as a drive shaft, configured to rotate, a hollow tube 76 rotationally coupled to the drive shaft 74 that has openings (shown in FIG. 4) formed therein, and one or more finger units 78 rotatably held within the hollow tube 76. Only one finger unit 78 is shown in FIGS. 2-5D for ease of illustration and description, but it should be appreciated that multiple finger units 78 can be included in the infeed assembly 72, as shown in FIG. 6.

Figure 3:
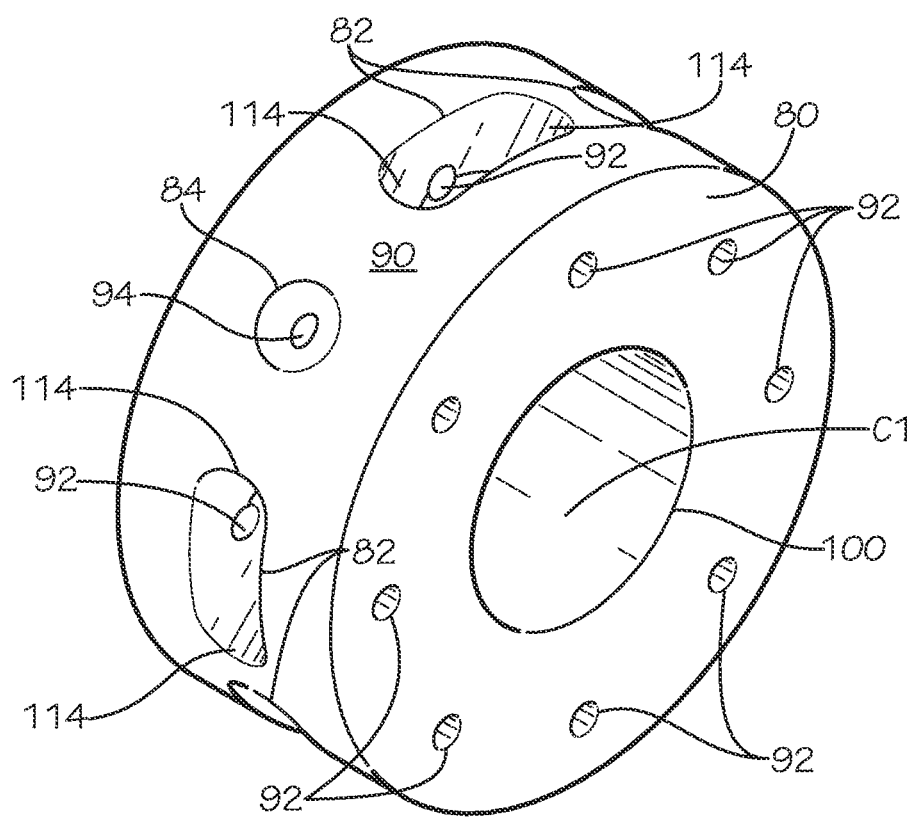
FIG. 3 is a perspective view of an embodiment of a finger hub shown in FIG. 2.

Further referring to FIG. 2 and also FIG. 3, the finger unit 78 includes a finger hub 80, which is shown in better detail in FIG. 3, with one or more pivoting apertures 82 (shown in FIG. 3) and one or more driving apertures 84 (shown in FIG. 3) formed therein, a pivoting finger 86 pivotally held within a pivoting aperture 82, and a driving finger 88 fixedly held within a driving aperture 84. As can be seen in FIG. 3, the finger hub 80 can include a single driving aperture 84 with seven pivoting apertures 82, but it is contemplated that there can be more than one driving aperture 84 and fewer or more than seven pivoting apertures 82 formed in the finger hub 80. Each pivoting aperture 82 can pivotally hold a pivoting finger 86 within and each driving aperture 84 can fixedly hold a driving finger 88 within, the significance of which will be further described further herein. The pivoting finger 86 and driving finger 88 can be formed as cylindrically shaped rods, as shown, or other shapes that allow the fingers 86 and 88 to push cut crop material toward the feeder housing 20 as the fingers 86 and 88 are rotated. It is also useful if the fingers 86 and 88 are formed of a rigid material that does not easily bend, such as a hard metal or polymer, so that when the fingers 86 and 88 contact cut crop material they will not be deformed so much that they are unable to move the cut crop material.

The finger hub 80 can be formed to have a circular cross-section, with a circumference defined about a center C1 of the finger hub 80 and a circumferential surface 90 defining an outer surface of the finger hub 80. The pivoting apertures 82 and driving aperture 84 can be formed in the circumferential surface 90 of the finger hub 80 so that fingers 86 and 88 held in the apertures 82 and 84 extend radially outward relative to the center C1 of the finger hub 80. The apertures 82 and 84 can be equally spaced along the circumferential surface 90 of the finger hub 80, as shown, or otherwise formed on the circumferential surface 90. The pivoting apertures 82 can be elongated slots, as shown, which have a length that extends along the circumference of the finger hub 80. Pin openings 92 can be formed through the finger hub 80 into the pivoting apertures 82, with pivot pins 94 (shown in FIG. 4) inserted through the pin openings 92 and openings (not shown) formed in the pivoting fingers 86 to allow the pivoting fingers 86 to pivot about the pivot pins 94 in the pivoting apertures 82. The driving aperture 84 can be formed to closely correspond to the driving finger 88 so the driving finger 88 is tightly held within the driving aperture 84 and its ability to pivot or otherwise move is extremely limited. Fixation openings 96 can be formed in the finger hub 80 that extend into the driving aperture 84 to allow fixation pins 98 (shown in FIG. 4) to be connected to the driving finger 88 and assist in keeping the driving finger 88 fixedly held within the driving aperture 84. The finger hub 80 can also be formed to have a central opening 100 that will allow the finger hub 80 to slide over a shaft.

Figure 4:
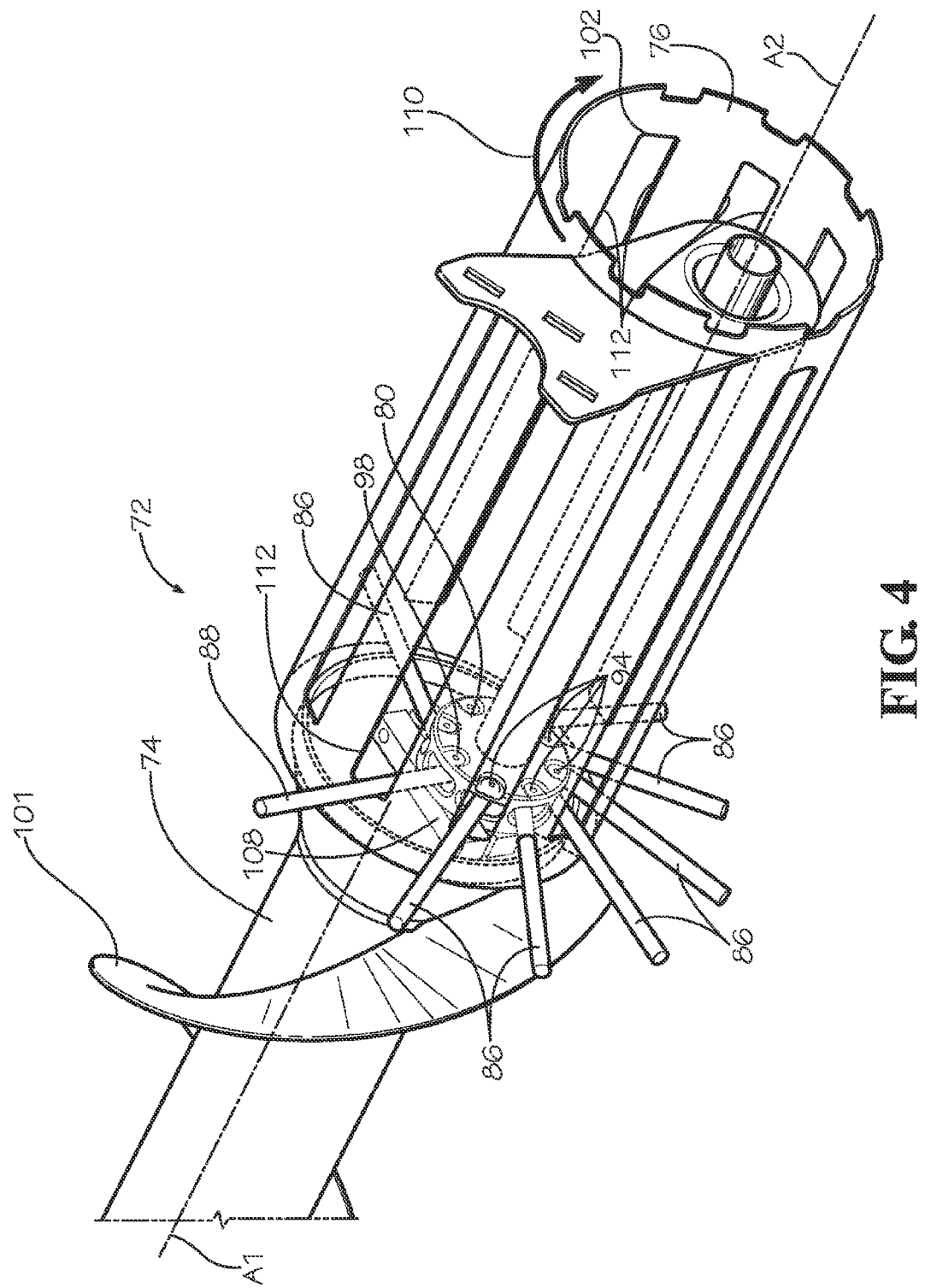
FIG. 4 is a perspective view of an embodiment of an infeed assembly shown in FIG. 2.

Referring now to FIG. 4, the infeed assembly 72 is shown in a perspective view to better illustrate its components. As can be seen, the drive shaft 74 can drive one auger of the double auger 38 and carry a flighting 101 so that as the drive shaft 74 rotates, the flighting 101 conveys cut crop material toward the infeed assembly 72. While the driving element 74 is shown as being a drive shaft of an auger, it is contemplated that the driving element 74 can be any type of rotating element. The hollow tube 76 is rotationally coupled to the drive shaft 74 such that rotation of the drive shaft 74 causes rotation of the hollow tube 76. The hollow tube 76 can be coupled to the drive shaft 74 in an orientation where the drive shaft 74 defines a tube axis of rotation A1 which the hollow tube 76 rotates about, i.e., the hollow tube 76 is concentrically coupled to the drive shaft 74. The hollow tube 76 is shown as being directly coupled to the drive shaft 74, but can also be indirectly coupled to the drive shaft 74 if desired. The hollow tube 76 has openings 102 formed therein which can extend entirely through an outer surface 104 of the hollow tube 76. As shown, the openings 102 are formed as elongated slots that extend along a length of the hollow tube 76, but the openings 102 can assume any shape that allows for fingers 86 and 88 of the finger unit 78 to extend into the openings 102. The elongated slots 102 can have a width in the direction of the circumference of the hollow tube 76 that is greater than the circumference of the fingers 86 and 88, allowing for relative movement between the hollow tube 76 and the fingers 86 and 88.

The finger unit 78 can be rotatably held inside the hollow tube 76 by sliding the central opening 100 of the finger hub 80 over a hub shaft 106 held in an axis block 108 connected to the drive shaft 74. The hub shaft 106 can define a hub axis of rotation A2 that, due to the position it is held in by the axis block 108, is parallel and offset from the tube axis of rotation A1. This offset allows the position of the fingers 86 and 88 relative to the elongated slots 102 of the hollow tube 76 to shift as the hollow tube 76 and finger unit 78 rotate, which is described further herein. The hub shaft 106 can be fixedly held in the axis block 108 so that the hub shaft 106 does not rotate and the finger unit 78 rotates about the hub shaft 106 but is not rotated by the hub shaft 106. The hub shaft 106 can be rotatably held anywhere within the hollow tube 76 that allows the driving finger 88 to extend into an opening 102 of the hollow tube 76 and the pivoting fingers 86 to extend out of openings 102.

In operation, the drive shaft 74 is rotated by a rotating element (not shown) in a direction of rotation, signified by arrow 110 and shown as clockwise. Since the hollow tube 76 is rotationally coupled to the drive shaft 74, the hollow tube 76 will also rotate as the drive shaft rotates 74. The driving finger 88 of the finger unit 78 is fixedly held in the finger hub 80 and extends into an opening 102 of the hollow tube 76 so that as the hollow tube 76 rotates, a side wall 112 of the opening 102 will be pressed against the driving finger 88 and force the driving finger 88 in the direction of rotation 110. Force applied to the driving finger 88 in the direction of rotation 110 is transmitted through the driving finger's 88 connection to the finger hub 80, causing the finger hub 80 to rotate about the hub shaft 106 and pivotally connected pivoting fingers 86 to rotate as well. Since the pivoting fingers 86 are pivotally connected to the finger hub 80, they will tend to pivot about their respective pivot pins 94 connecting the pivoting fingers 86 to the finger hub 80 in the direction of rotation 110 and gravity. Pivoting movement of the pivoting fingers 86 can be limited by sidewalls 112 of the respective opening 102 that each pivoting finger 86 extends through as well as sidewalls 114 of the pivoting aperture 82 the pivoting finger 86 is held within. This pivoting movement of the pivoting fingers 86 allows for the angle of incidence formed between each pivoting finger 86 and the finger hub 80 to change as the finger unit 78 rotates.

Figure 5A:
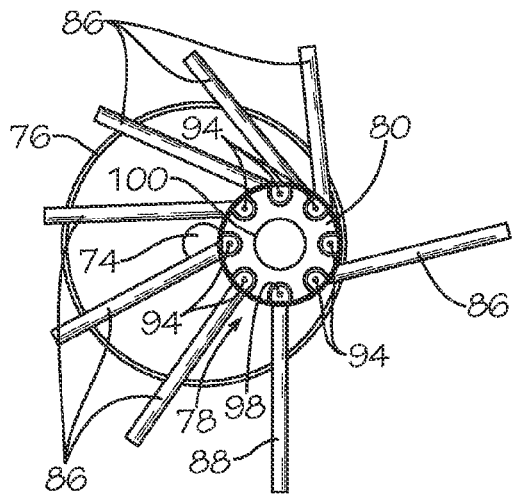
FIG. 5A is a sectional view of the infeed assembly shown in FIG. 4 in a first rotated position.
Figure 5B:
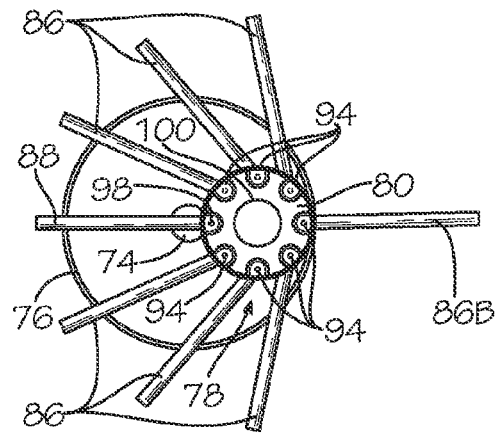
FIG. 5B is a sectional view of the infeed assembly shown in FIGS. 4-5A in a second rotated position.
Figure 5C:
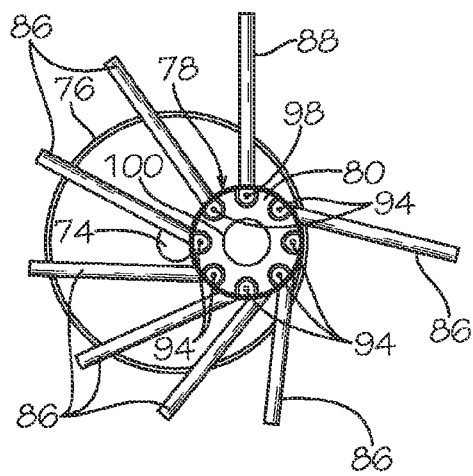
FIG. 5C is a sectional view of the infeed assembly shown in FIGS. 4-5B in a third rotated position.
Figure 5D:
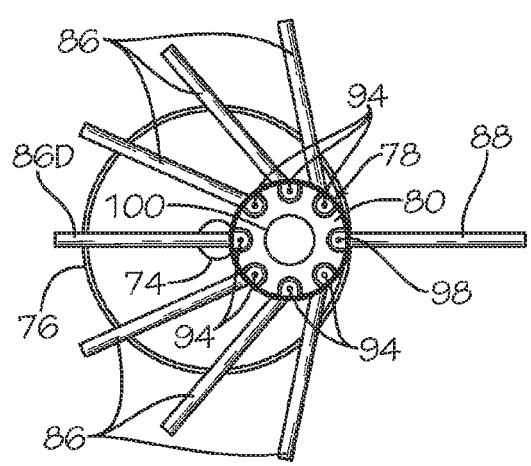
FIG. 5D is a sectional view of the infeed assembly shown in FIGS. 4-5C in a fourth rotated position.
Figure 6:
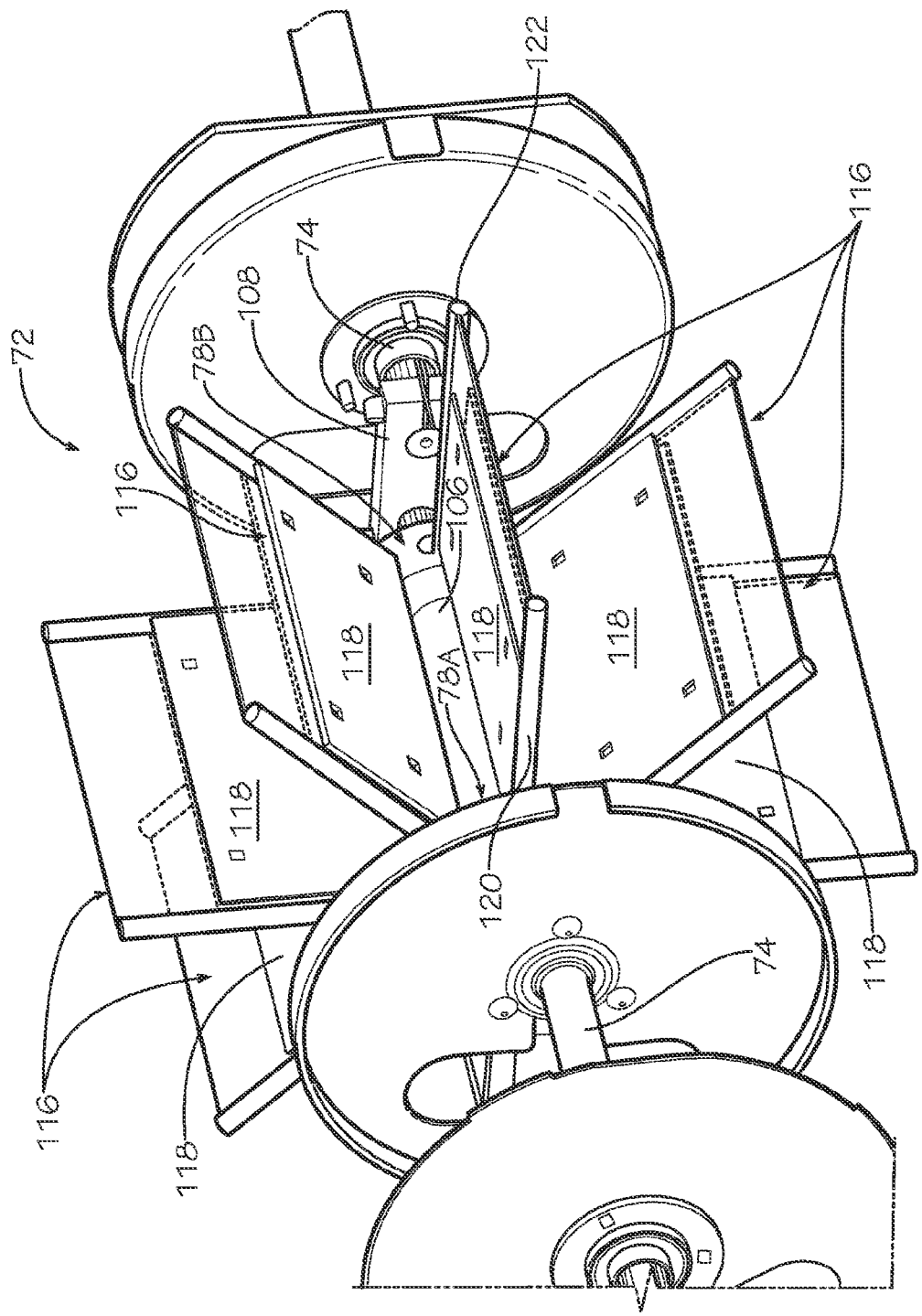
FIG. 6 is a perspective view of an infeed assembly shown in FIG. 2 with two finger units forming paddles.

Referring now to FIGS. 5A-5D, the position of the fingers 86 and 88 relative to the finger hub 80 and changing angle of incidence can be seen. For ease of description, reference will be made to the clock position of various fingers when describing FIGS. 5A-5D, with it being understood that the clock positions analogize the fingers 86 and 88 to hands on a standard 12 hour clock having 30 degrees between each hour. As can be seen in FIG. 5A, the driving finger 88 is in the 6 o'clock position, with pivoting fingers 86 at various angles relative to the finger hub 80. When the hollow tube 76 rotates so that the finger unit 78 rotates 90 degrees clockwise, as shown in FIG. 5B, the driving finger 88 assumes the 9 o'clock position and the angles between the pivoting fingers 86 and the finger hub 80 switch due to the pivoting fingers 86 pivoting so that they stay in their respective opening 102 of the hollow tube 76. When the driving finger 88 is in the 9 o'clock position, it is transverse to both the tube axis of rotation A1 defined by drive shaft 74 and the hub axis of rotation A2 defined by hub shaft 106. In this position, one of the pivoting fingers, designated as pivoting finger 86B, is also transverse to both the tube axis of rotation A1 and hub axis of rotation A2. When the finger unit 78 rotates another 90 degrees clockwise, as shown in FIG. 5C, the driving finger 88 assumes the 12 o'clock position and the pivoting fingers 86 pivot again to different angles relative to the finger hub 80. When the driving finger 88 is in the 12 o'clock position, the pivoting fingers 86 congregate near the 6 o'clock position of the finger hub 80. Finally, when the finger unit 78 rotates another 90 degrees clockwise, as shown in FIG. 5D, the driving finger 88 assumes the 3 o'clock position. In the 3 o'clock position, the driving finger 88 is once again transverse to both the tube axis of rotation A1 and hub axis of rotation A2 and one pivoting finger, designated as 86D, is also transverse both axes of rotation A1 and A2. It can therefore be seen from FIGS. 5A-5D that when the hub shaft 106 defining the hub axis of rotation A2 is offset a distance from the drive shaft 74 defining the tube axis of rotation A1 toward the cutting mechanism 34, the fingers 86 and 88 will tend to fully extend at a point near the cutting mechanism 34 and retract as they travel away from the cutting mechanism 34. This allows for the fingers 86 and 88 to extend out of the hollow tube 76 and push cut crop material toward the feeder housing 20 as they approach the cutting mechanism 34 and retract back into the hollow tube 76 as they move away from the cutting mechanism 34.

Referring now to FIG. 6, the infeed assembly 72 is shown with two finger units 78 forming paddles 116. For ease of illustration, the hollow tube 76 that the finger units 78 are held within has been omitted from FIG. 6. As can be seen, the paddles 116 can be formed by attaching plates 118 between one finger, with an example finger being designated 120, of a first finger unit, designated 78A, and another finger, designated 122, of a second finger unit, designated 78B. Rigid paddles 116 can be formed by connecting two pivoting fingers 86 or two driving fingers 88 of adjacent finger units 78, since the connected fingers will tend to stay in the same plane during rotation, and more flexible paddles can be formed by connecting a pivoting finger 86 to a driving finger 88 of an adjacent finger unit 78. When paddles 116 are formed between adjacent finger units 78, the openings 102 of the hollow tube 76 that the fingers 120 and 122 forming the paddles 116 extend through should also be shaped to allow extension of the plates 118 therethrough. It is useful if the fingers 120 and 122 forming part of the paddle 116 are rigid, since the paddle 116 can be configured to push more cut crop material than fingers 120 and 122 would be able to without the connecting plate 118 and the resulting pushback force from the cut crop material could bend a flimsy finger. It should be appreciated that the fingers 120 and 122 forming part of the paddle 116 can be connected by a planar plate 118 formed of sheet metal, as shown, or the plate 118 can be formed of a polymer or other material or be at least partially curved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural harvester, comprising:
a chassis;
a threshing and separating mechanism carried by said chassis;
a feeder housing carried by said chassis and configured to supply crop material to said threshing and separating mechanism; and
a header carried by said chassis in front of said feeder housing, said header including a cutting mechanism configured to cut crop material and an infeed assembly carried behind said cutting mechanism configured to direct the cut crop material toward said feeder housing, said infeed assembly including:
a driving element configured to rotate;
a hollow tube coupled to said driving element and having a plurality of openings formed therein, wherein said driving element is the shaft of an auger, the shaft having flighting extending therefrom; and
at least one finger unit rotatably held within said hollow tube, each finger unit including:
a finger hub having at least one pivoting aperture formed therein and at least one driving aperture formed therein;
a pivoting finger pivotally held within said at least one pivoting aperture and configured to at least partially extend out of one of said plurality of openings of said hollow tube during rotation; and
a driving finger fixedly held within said at least one driving aperture and configured to at least partially extend into one of said plurality of openings of said hollow tube to rotate said finger unit by said hollow tube.

2. The agricultural harvester according to claim 1, wherein said infeed assembly includes at least two finger units rotatably held within said hollow tube and a plate connecting one of a pivoting finger and a driving finger of a first finger unit to one of a pivoting finger and a driving finger of a second finger unit to form a paddle.

3. The agricultural harvester according to claim 1, wherein said finger unit includes a hub shaft held within said hollow tube, said at least one finger hub being rotatably held on said hub shaft.

4. The agricultural harvester according to claim 3, wherein said driving element defines a tube axis of rotation aligned across a harvesting width of the header and said hub shaft defines a hub axis of rotation, said hub axis of rotation being offset horizontally from said tube axis of rotation.

5. The agricultural harvester according to claim 1 wherein a diameter of the hollow tube is greater than a diameter of the shaft.

6. The agricultural harvester according to claim 1, wherein said finger hub has a circular cross-section and said at least one pivoting aperture and said at least one driving aperture are formed on a circumferential surface of said finger hub.

7. The agricultural harvester according to claim 6, wherein said finger hub defines a circumference and said at least one pivoting aperture is an elongated aperture extending along said circumference on said circumferential surface.

8. The agricultural harvester according to claim 6, wherein said finger hub has at least one pin opening formed through to said at least one pivoting aperture and a pivot pin pivotally connected to said pivot finger placed in said at least one pin opening.

9. The agricultural harvester according to claim 1, wherein said at least one pivoting finger and said at least one driving finger are rigid.

10. An infeed assembly for a header of an agricultural harvester, comprising:
a driving element configured to rotate;
a hollow tube rotationally coupled to said driving element and having a plurality of openings formed therein; and
at least one finger unit rotatably held within said hollow tube, each finger unit including:
a finger hub having at least one pivoting aperture formed therein and at least one driving aperture formed therein;
a pivoting finger pivotally held within said at least one pivoting aperture and configured to at least partially extend out of one of said plurality of openings of said hollow tube during rotation; and
a driving finger fixedly held within said at least one driving aperture and configured to at least partially extend into one of said plurality of openings of said hollow tube to rotate said finger unit by said hollow tube;
wherein said infeed assembly includes at least two finger units rotatably held within said hollow tube and a plate connecting one of a pivoting finger and a driving finger of a first finger unit to one of a pivoting finger and a driving finger of a second finger unit to form a paddle.

11. The infeed assembly according to claim 10, wherein said finger unit includes a hub shaft held within said hollow tube, said at least one finger hub being rotatably held on said hub shaft.

12. The infeed assembly according to claim 11, wherein said driving element defines a tube axis of rotation and said hub shaft defines a hub axis of rotation, said hub axis of rotation being offset from said tube axis of rotation.

13. The infeed assembly according to claim 10, wherein at least one of said plurality of openings formed in said hollow tube is an elongated slot.

14. The infeed assembly according to claim 10, wherein said finger hub has a circular cross-section and said at least one pivoting aperture and said at least one driving aperture are formed on a circumferential surface of said finger hub.

15. The infeed assembly according to claim 14, wherein said finger hub defines a circumference and said at least one pivoting aperture is an elongated aperture extending along said circumference on said circumferential surface.

16. The infeed assembly according to claim 14, wherein said finger hub has at least one pin opening formed through to said at least one pivoting aperture and a pivot pin pivotally connected to said pivot finger placed in said at least one pin opening.

17. The infeed assembly according to claim 10, wherein said at least one pivoting finger and said at least one driving finger are rigid.

* * * * *